No. 704,856. Patented July 15, 1902.
W. S. CAPPELLER & C. S. PATTESON.
COUPON COLLECTION AND RECEIPT BOOK.
(Application filed July 29, 1901.)

(No Model.)

UNITED STATES PATENT OFFICE.

WILLIAM S. CAPPELLER, OF MANSFIELD, OHIO, AND CHARLES S. PATTESON, OF NEW YORK, N. Y.

COUPON COLLECTION AND RECEIPT BOOK.

SPECIFICATION forming part of Letters Patent No. 704,856, dated July 15, 1902.

Application filed July 29, 1901. Serial No. 70,171. (No model.)

*To all whom it may concern:*

Be it known that we, WILLIAM S. CAPPELLER, a resident of Mansfield, in the county of Richland and State of Ohio, and CHARLES S. PATTESON, a resident of New York, in the county of New York and State of New York, citizens of the United States, have invented certain new and useful Improvements in Coupon Collection and Receipt Books; and we hereby declare that the following is a full, clear, and exact description of the same, reference being had to the annexed drawings, making a part of this specification, and to the letters of reference marked thereon.

The objects of our invention are, first, to provide a coupon collection and receipt book that will save time and labor in making out and giving receipts; second, to provide a means of keeping a record of the date of the beginning (including the day, month, and year) of a subscription or the patronage of a customer, in conjunction with a blank space upon which any instruction or data can be printed—*i. e.*, place and method of delivery, amount due prior to the issue of the coupon-book, and dates of payment on account—and the name and number designating such subscriber or customer; third, to construct a coupon collection and receipt book that will obviate the necessity of making out a new receipt for a different amount, period of time, and date when payment is not made when due; fourth, to devise a coupon collection and receipt book that will obviate the necessity of writing, printing, or otherwise placing on each separate receipt the name of a customer or subscriber.

The invention therefore consists in a collection coupon and receipt book constructed substantially as shown in the drawings and hereinafter described and claimed.

Figure 1 of the drawings is a perspective view of the book constructed in accordance with our invention, showing the book open. Fig. 2 is a top view showing the face of the front cover. Fig. 3 is a top view of the third page or inside face of back cover.

Similar letters refer to similar parts throughout the several views.

In the accompanying drawings, A represents the second page of the cover, which may be made of cardboard or any suitable material adapted to the purpose and of any suitable length or width. On the left side of the second page of the cover a vertical column of figures B, beginning with the figure "1" and ending with the figure "31," is printed or otherwise placed thereon to designate the day of the month. At the top of the second page of the cover, transversely therewith, the months of the year C are printed or otherwise placed thereon. The right side D of the second page of the cover is reserved for recording the year or years. By this arrangement the beginning of a subscription or the patronage of a customer can be recorded by punching or marking the day, month, and year in each respective column. At the top of the first and second pages of the cover a number E or other mark of identification is printed or otherwise placed thereon adjacent to the transverse column C, the purpose of which is to represent the name of the person for whom the receipt-book is issued. Two blank lines F F are printed upon the first page of the cover upon which the name of the subscriber or customer is written in the blank space. On the first page of the cover G, (outlined by the letters XXXX,) under the name of the customer or subscriber, any instruction or data can be inserted, as shown in the drawings, that shown being especially applicable to newspaper-carriers.

A leaf or series of leaves H and the cover A are bound together by wire staples, stitching, or any other well-known manner found preferable. Said leaf or series of leaves are perforated transversely along lines, as shown by reference-letter J, the spaces between said lines of perforations being reserved for receipt K. The form or kind of receipt it is desired to use can be varied by decreasing or increasing the space between the lines of perforations. The central portion K' of the receipt K contains the subject-matter of the receipt. On the left side of each receipt a number or mark L, corresponding with number or mark given to the customer or subscriber for whom the book is issued, is printed or otherwise placed thereon. If it corresponds with the number on the cover of the book, the name of the customer or subscriber to whom the receipt was issued can be ascertained by reference to the name written on the blank lines F F. On the right side M of each receipt the day, month, and year of the issuance of said receipt is printed. Each coupon is similar in form and substance, except as to dates, no two of which are alike, the date of the preceding coupon varying according to the time set for collections to be made. The earliest date is printed on the free end of the leaf or leaves containing a series of coupon-receipts, and these coupon-receipts are detached from the preceding coupon in their chronological order. It is apparent that a coupon collection and receipt book, as described, can be made to cover any period of time by increasing the length of the leaf or adding to the series of leaves comprising the coupon-receipts.

On the third and fourth pages of the cover any advertising matter ("directions for collectors, &c.,") can be printed to suit the requirements of the trade for which the book is manufactured. On the first page of the cover of the book the number and name of the customer or subscriber, the name of the person, firm, or corporation for whom the books are made, and on the inside of the back cover the instructions to carrier, directions for collection, or other data is printed.

The method of using the coupon collection and receipt book described above is as follows: A complete book covering the period of time and the dates upon which collections are to be made is assigned to each customer or subscriber. The name of such subscriber or customer is written on the blank lines F F, the number on the cover of said book, and the corresponding number on the coupon-receipt designates the name of each customer or subscriber, and instead of writing the name of each customer or subscriber on each coupon-receipt he is identified by means of a number or mark. The book is then given to the collector on the date set for collection, and when payment is made a coupon is detached and given to the customer or subscriber. The date on the succeeding coupon shows the date for the next collection. The book is then taken to the office and the amount collected is credited. If the amount due on the date set for collection is not collected on said date, but is collected on the next or any other collection-day, one or more of the coupon-receipts is detached, according to the amount then due.

We do not limit ourselves to the exact construction described, as it is obvious that modifications can be made without deviating from the principle herein involved.

What we claim as our invention, and desire to secure by Letters Patent, is—

A coupon collection and receipt book comprising covers, the outside face of the front cover provided with a designating-numeral, spaces for the reception of a name and place of residence, instructions as to the place of delivery of an article, and the name and address of the party with whom the account is opened, the inside face of the front cover provided with data indicating the date on which the account was opened, a designating-numeral corresponding with the one on the outside face of the front cover, and appropriately-designated spaces for the entry of any amounts due prior to the issue of the book and for the entry of amounts paid on account of prior amounts due, the inside face of the back cover containing instructions to carriers, and a plurality of leaves bound with the covers, the leaves wholly consisting of a series of detachable coupons, each coupon bearing a date, a designating-numeral corresponding to the other designating-numerals heretofore mentioned, and a receipt signifying the amount paid, the article for which it was paid and the length of time during which the article paid for will be delivered, the date on the coupon corresponding with the date on which the subscription for the article ends, the coupons arranged in consecutive order from the bottom to the top of the leaf, each coupon being detachably secured to the one adjacent thereto and above it.

Signed by us at Mansfield, county of Richland, and State of Ohio, this 16th day of July, 1901.

WILLIAM S. CAPPELLER.
CHARLES S. PATTESON.

Witnesses:
JOHN H. COSS,
EDITH CLINE.